United States Patent [19]
Merecki et al.

[11] Patent Number: 5,673,125
[45] Date of Patent: Sep. 30, 1997

[54] SCANNING SYSTEM FOR SCANNING TRANSMISSIVE AND REFLECTIVE ORIGINALS

[75] Inventors: John A. Merecki, Brentwood, N.H.; John F. Omvik, North Andover, Mass.

[73] Assignee: Agfa Division, Bayer Corporation, Wilmington, Mass.

[21] Appl. No.: 510,954

[22] Filed: Aug. 3, 1995

[51] Int. Cl.[6] .................... H04N 1/04; H01J 3/14
[52] U.S. Cl. .................. 358/487; 358/474; 358/475; 358/496; 358/497; 358/498; 358/494; 358/471; 250/234; 250/235
[58] Field of Search ................... 358/471, 474, 358/487, 497, 494, 496, 401, 501, 476, 475, 498, 461, 464, 512, 505; 250/234, 235

[56] References Cited

U.S. PATENT DOCUMENTS

| | | | |
|---|---|---|---|
| 3,621,135 | 11/1971 | Brouwer et al. | 358/476 |
| 4,873,579 | 10/1989 | Kubota et al. | 358/474 |
| 4,893,196 | 1/1990 | Koshiyouji et al. | 358/474 |
| 4,930,016 | 5/1990 | Yazawa et al. | |
| 5,140,443 | 8/1992 | Iwahara et al. | |
| 5,325,217 | 6/1994 | Nagler et al. | 358/487 |
| 5,392,100 | 2/1995 | Yoshida | 358/494 |
| 5,414,532 | 5/1995 | Akiyama | |
| 5,420,700 | 5/1995 | Maeda et al. | 358/487 |
| 5,457,547 | 10/1995 | Yamada | 358/487 |
| 5,523,876 | 6/1996 | Tellam et al. | 358/474 |
| 5,532,846 | 7/1996 | Brook et al. | 358/487 |

Primary Examiner—Edward L. Coles, Sr.
Assistant Examiner—Mark Wallerson
Attorney, Agent, or Firm—John A. Merecki

[57] ABSTRACT

A scanning system comprising a cleaning apparatus for automatically cleaning originals prior to scanning and a dual mode scanner for scanning transmissive and reflective originals. The cleaning apparatus includes an ionizing dust remover and an electrically conductive brush assembly for sweeping dust and other foreign particles from the surfaces of the originals to be scanned.

13 Claims, 5 Drawing Sheets

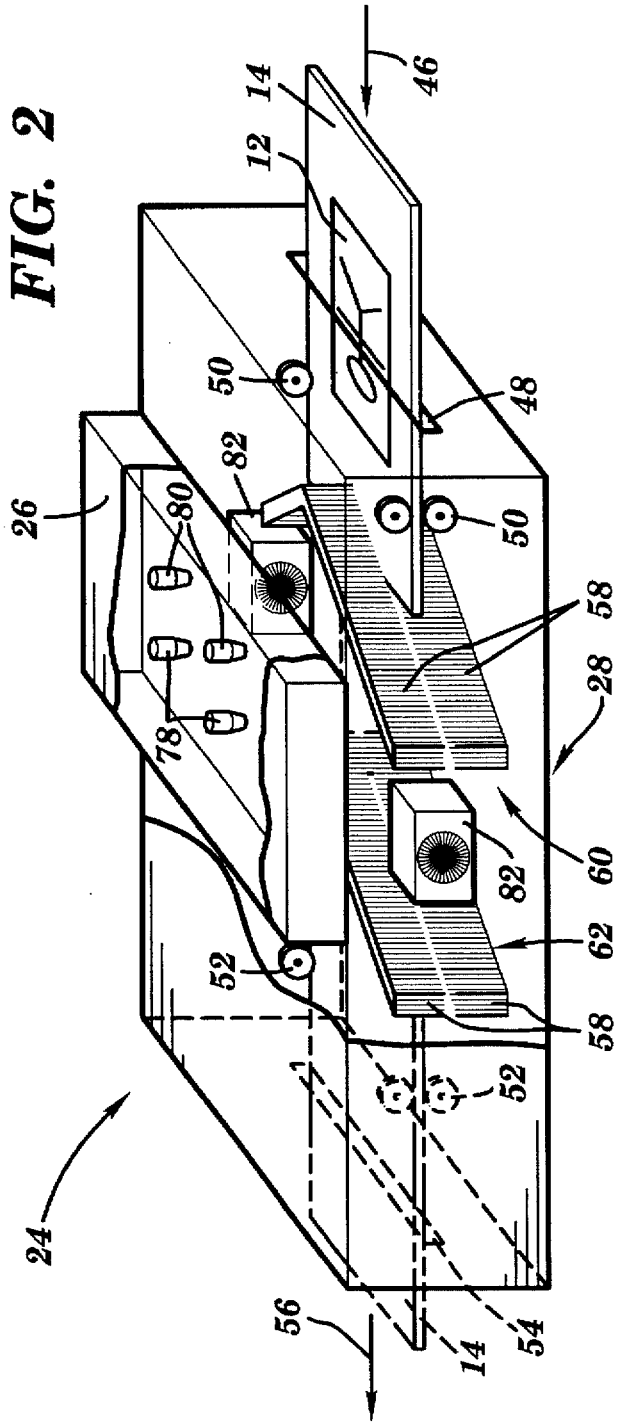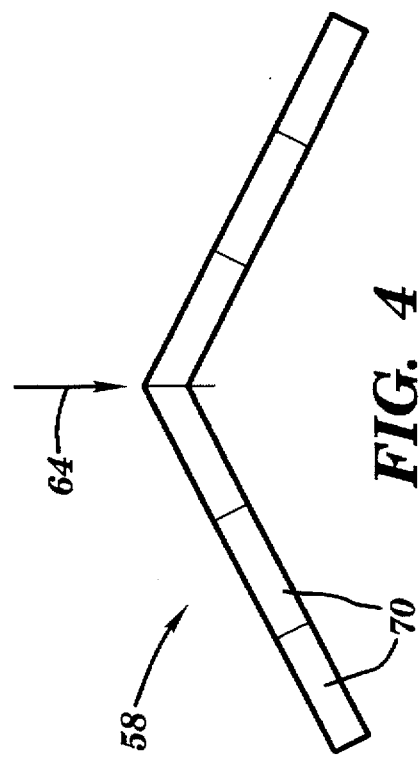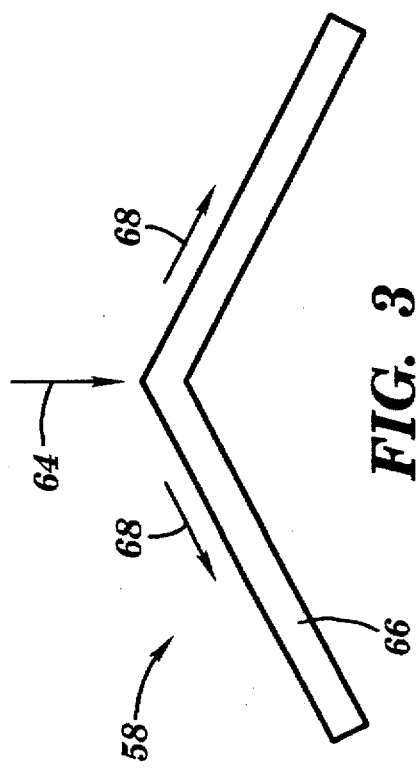

SCANNING SYSTEM FOR SCANNING TRANSMISSIVE AND REFLECTIVE ORIGINALS

FIELD OF THE INVENTION

The present invention relates in general to scanning systems. More particularly, the present invention is directed to a scanning system incorporating a dual-mode scanner capable of scanning transmissive and reflective original documents, hereinafter referred to as "originals", and an ionizing cleaning apparatus for removing dust and other foreign particles from the surfaces of the originals prior to scanning.

BACKGROUND OF THE INVENTION

As is known in the art, dust and other foreign particles which have settled on an original to be scanned can seriously affect scanning quality by producing unwanted artifacts in the scanned image. This is especially true during the scanning of transmissive originals, such as color negatives, photographic transparencies and the like, which are commonly scanned at resolutions of up to 4,000 pixels per inch (ppi). Although foreign particles on a reflective original to be scanned may also produce unwanted artifacts, reflective originals are typically scanned at much lower resolutions (e.g., 1,200 ppi), lessening the impact of dust on the scanned image. Nevertheless, it should be readily apparent that the quality of a scanned image, whether obtained from a transmissive or reflective original, is highly dependent upon the cleanliness of the original during scanning.

SUMMARY OF THE INVENTION

The present invention provides a scanning system including an apparatus for automatically cleaning originals prior to scanning to substantially eliminate the detrimental effects of dust and other foreign particles on a scanned image. Once cleaned, each original is automatically transported to a scanner for subsequent scanning.

The transmissive or reflective originals to be scanned, each preferably mounted in a media holder, are transported to the object focal plane of the scanner through an input chute. Incorporated into the input chute is an ionizing cleaning apparatus including an ionizing dust remover and an electrically conductive brush assembly. The ionizing dust remover includes a series of positive and negative ionizing probes (i.e., emitters) for neutralizing dust-attracting electrostatic charge on the surfaces of the original to be scanned. The electrically conductive brush assembly is designed to sweep dust toward the sides of the original to be scanned. Once removed from the surfaces of the original, the dust is captured in the bristles of the electrically conductive brushes and/or by a suitable filtering system. The ionizing cleaning apparatus may additionally utilize one or more fans to create a turbulent air flow across the surfaces of the original, thereby facilitating the removal of dust therefrom. Once cleaned by the ionizing cleaning apparatus, the media holder carrying the original is transported to the object focal plane of the scanner for subsequent scanning.

BRIEF DESCRIPTION OF THE DRAWINGS

The features of the present invention will best be understood from a detailed description of the invention and a preferred embodiment thereof selected for the purposes of illustration and shown in the accompanying drawings in which:

FIG. 2 is an operational view of the ionizing cleaning apparatus, illustrating the operation of the ionizing dust remover and the electrically conductive brush assembly;

FIG. 3 illustrates a first embodiment of a brush member used in the electrically conductive brush assembly to sweep and collect dust from the surfaces of an original to be scanned;

FIGS. 4, 5, and 6 illustrate alternate embodiments of the brush members used in the electrically conductive brush assembly;

DETAILED DESCRIPTION OF THE INVENTION

Figure 1:
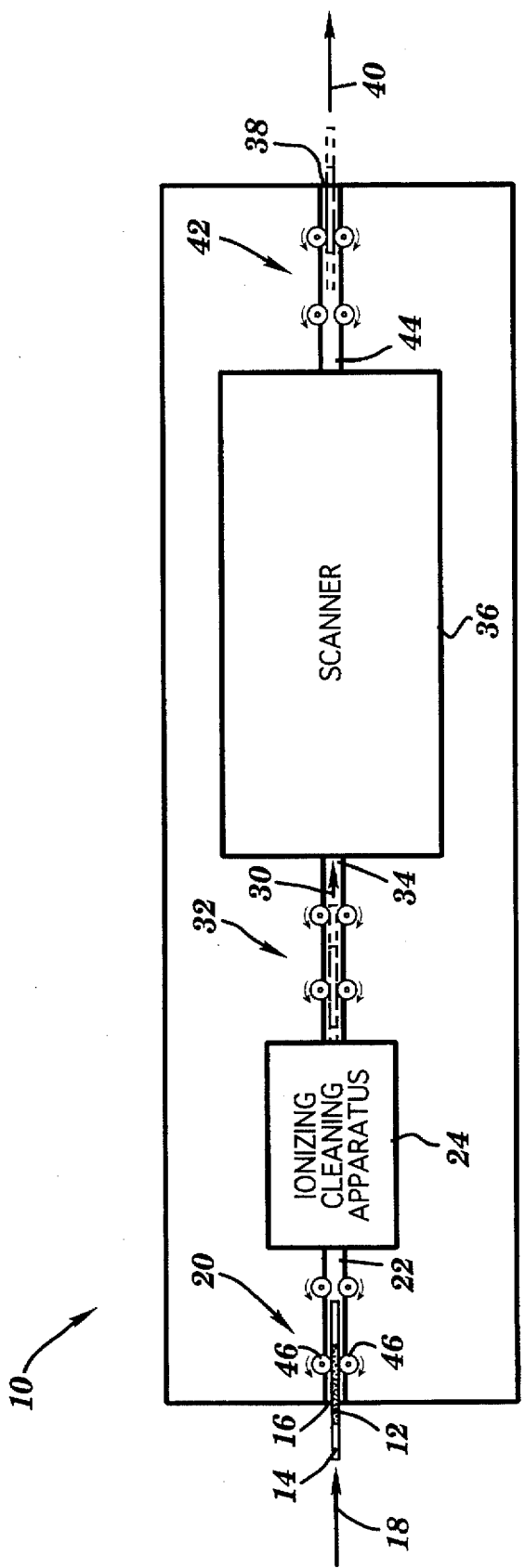
FIG. 1 illustrates a scanning system in accordance with the present invention, wherein the scanning system includes an ionizing cleaning apparatus and a scanner.

Referring now specifically to the accompanying drawings, there is illustrated a scanning system, generally designated as 10, in accordance with the present invention, wherein like reference numerals refer to like elements throughout the drawings.

As illustrated in block diagram form in FIG. 1, the scanning system 10 of the present invention is designed to automatically clean and scan a transmissive or reflective original 12 that has been suitably mounted to a media holder 14. Although each original to be scanned by the scanning system 10 is preferably mounted to a media holder 14, e.g., to protect the original throughout the scanning process, it should be readily apparent that the scanning system 10 can also be utilized to clean and scan originals that have not been mounted to a media holder.

The media holder 14 is preferably constructed from two sections of sheet metal sandwiched together magnetically. For a reflective original, at least one of the sections of sheet metal includes an aperture corresponding to the size of the original to be scanned. For a transmissive original, both sections include such an aperture.

After the media holder 14 has been inserted into the scanning system 10 through an entrance aperture 16 (directional arrow 18), it is displaced by a transport mechanism 20 through an input chute 22 into an ionizing cleaning apparatus 24. In the ionizing cleaning apparatus 24, dust and other foreign particles are removed from at least one surface of the original 12. As disclosed below in greater detail with reference to FIG. 2, the ionizing cleaning apparatus 24 utilizes an ionizing dust remover 26 and an electrically conductive brush assembly 28 to remove and capture dust from the surface(s) of the original 12 prior to scanning, thereby improving the quality of the scanned image.

Once cleaned by the ionizing cleaning apparatus 24, the media holder 14 containing the original 12 is displaced (directional arrow 30) by a transport mechanism 32 through a chute 34 to a scanner 36, where a digitized image of the transmissive or reflective original is obtained. Thereafter, the media holder 14 is ejected from the scanning system 10 through an exit aperture 38 (directional arrow 40). Again, a transport mechanism 42 is utilized to displace the media holder 14 through a chute 44 from the scanner 36 toward and through the exit aperture 38 of the scanner system 10.

Each transport mechanism 20, 32, 42 preferably comprises a series of pairs of counterrotating nip rollers 46 which are suitably arranged to grip opposing sides of the edges of a media holder 14. By driving (i.e., rotating) specific ones (or all) of the nip rollers 46 in each transport mechanism 20, 32, 42, the media holder 14 is displaced along chutes 22, 34, and 44 through the scanning system 10. Other nip rollers may also be used, if necessary, to facilitate the displacement of the media holder 14 through the ionizing cleaning apparatus 24 (FIG. 2) and/or scanner 36. Of course, other means known in the art may be used to displace a media holder 14 into, through, and out of the scanning system 10 without departing from the scope of the present invention.

The ionizing cleaning apparatus 24 is illustrated in greater detail in FIG. 2. Generally, the ionizing cleaning apparatus 24 utilizes an ionizing dust remover 26 and an electrically conductive brush assembly 28 to remove and capture dust from the surfaces of an original 12 mounted in a media holder 14.

As indicated by directional arrow 46, transport mechanism 20 passes the media holder 14 into the ionizing cleaning apparatus 24 through opening 48. Depending upon the relative lengths of the media holder 14 and the ionizing cleaning apparatus 24, a first set of nip rollers 50 may be used to displace the media holder 14 into and/or through the ionizing cleaning apparatus 24. Analogously, a second set of nip rollers 52 may be used to eject the media holder 14 from the ionizing cleaning apparatus 24 into chute 34 through opening 54 (directional arrow 56). Upon exiting the ionizing cleaning apparatus 24, the media holder 14 is passed to the scanner 36 by transport mechanism 32. The electrically conductive brush assembly 28 is designed to sweep off, and collect dust removed from, the surfaces of the original 12 as the media holder 14 is displaced through the ionizing cleaning apparatus 24. Preferably, the individual brushes of the electrically conductive brush assembly 28 are configured in a "snowplow" configuration to sweep dust toward the sides of the original for collection. Several "snowplow" configurations are illustrated in FIGS. 3–6.

In the preferred embodiment illustrated in FIG. 2, the electrically conductive brush assembly 28 uses two pairs of individual brush members 58, each arranged in a "snowplow" configuration, to clean opposing sides of an original 12 as it passes through the ionizing cleaning apparatus 24. Of course, the interference between the bristles of the individual brush members 58 and the surfaces of the original 12 is sufficient to remove dust without damaging the original.

A first pair 60 of the brush members 58 is used to clean the opposing surfaces of the original 14 as the media holder 14 passes into the ionizing cleaning apparatus 24 through opening 48. A second pair 62 of the brush members 58 again cleans the opposing surfaces of the original 14 after static charges on the original have been removed by the ionizing dust remover 26. Any dust or foreign matter removed from the original 14 is collected in the bristles of the brush members 58. Preferably, the brush members 58 are removably disposed within the ionizing cleaning apparatus 24 to allow for cleaning and/or replacement when necessary.

Although many types of brushes may be used in accordance with the teachings of the present invention, the brush members 58 are preferably anti-static in nature to facilitate dust removal from the static-prone surfaces of the original 12. One suitable brush, available from Kinetronics of Sarasota, Fla., includes both natural hair and conductive fiber bristles fixed in a conductive polypropylene base portion.

Referring now specifically to FIGS. 3–6, there are illustrated several "snowplow" configurations of the brush members 58. In each of these configurations, one or more individual brushes are arranged at an angle with respect to the direction of displacement (directional arrow 64) of the media holder 14 to remove dust from the surfaces of the original 12.

In FIG. 3, the brush member 58 comprises a single, inverted V-shaped, brush 66. As a media holder 14 is passes under (or over) the brush 66 along feed direction 64, dust and the like is swept toward the edges of the original 12 (directional arrows 68), eventually being captured within the bristles of the brush 66. Of course, other means such as a vacuum system may be used to capture dust removed from the original 12 by brush 66.

Figure 5:
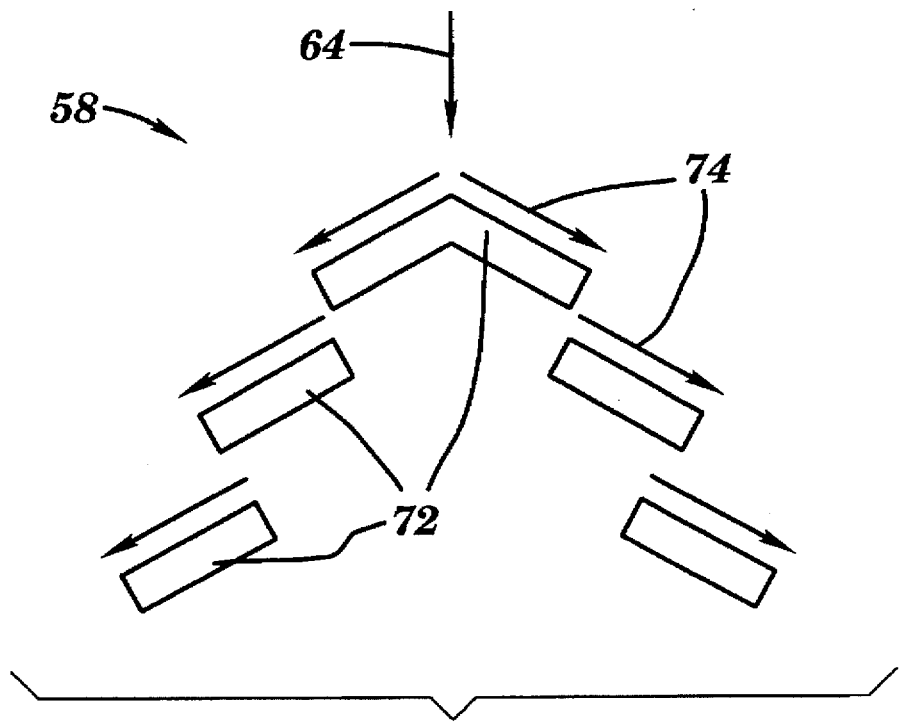
Figure 6:
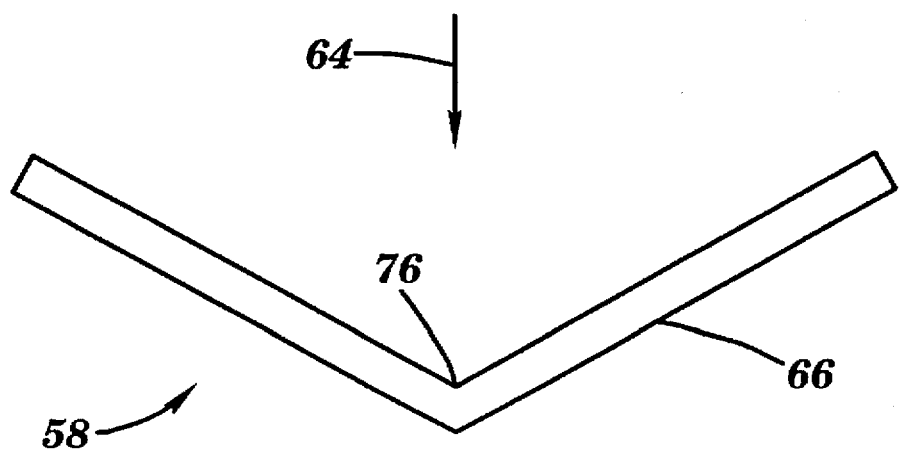

Several alternate embodiments of the brush member 58 are illustrated in FIGS. 4, 5, and 6. In FIG. 4, the brush member 58 is formed of a plurality of individual, contiguous brush segments 70 disposed in an inverted V-shaped arrangement. In FIG. 5, a plurality of brush segments 72 are arranged in an noncontiguous, overlapping configuration, again having a generally inverted V-shape to sweep dust toward the edges of the original 12 (directional arrows 74). Each of brush segments 72 may be arranged at substantially the same angle with respect to the feed direction 64 or at varying angles. Finally, in FIG. 6, the brush member 58 of FIG. 3 is inverted with respect to the direction of displacement (directional arrow 64) of the media holder 14. In this configuration, dust is directed inward toward the bottom 76 of the (now) V-shaped brush 66. Since the dust is now directed toward the center of the original 12, a vacuum or other dust collection means may be utilized to prevent excessive dust build-up at the bottom 76 of the V-shaped brush 66.

The ionizing dust remover 26 illustrated in FIG. 2 uses a bi-polar ionizing arrangement of a type known in the art, including a series of positive and negative ionizing emitters 78, 80, to remove dust-attracting electrostatic charges from the surfaces of the original 12. The emitters 78, 80 are preferably positioned between the first and second pairs 60, 62 of brush members 58 on at least one side of the original 12.

As shown in FIG. 2, a pair of fans 82 are positioned on opposite sides of the ionizing cleaning apparatus 24. The fans 82 force air in opposite directions (directional arrows 84) across the surfaces of the original 12 as the original passes between the first and second pairs 60, 62 of brush members 58. The turbulent airflow created by the coaction of the fans 82 forces dust from the surfaces of the original, there facilitating the dust removal process. The dust, once removed from the original, is captured by brush members 58. Alternately, one or more of the fans 82 may be used to force air out of the ionizing cleaning apparatus 24. In such a configuration, any dust not captured by the brush members 58 is expelled from the ionizing cleaning apparatus 24 where it may be captured by a filtering system or the like.

After being cleaned by the ionizing cleaning apparatus 24, the original 12 is displaced through chute 34 to the scanner 36 by transport mechanism 32. Several embodiments of a dual-mode scanner, suitable for the scanning of transmissive and reflective originals, are illustrated in FIG. 7 (A–B) and FIG. 8. (A–B).

The scanner 36 shown in FIGS. 7 (A–B) includes a scan carriage 80 enclosed within an outer housing 82. In operation, a media holder 14 containing an original 12 to be scanned enters the scanner 36 through chute 34, passes through the scan carriage 80, and exits the scanner through chute 44. A digitized representation of the original 12 is obtained as the media holder 14 passes through the scan carriage 80.

The scan carriage 80 uses an illumination system, comprising a plurality of lamps 84, 86, 88, to illuminate a scan line 90 (perpendicular to page) on the original 12. The illuminated scan line 90 is imaged on a sensing system 92 by an optical system 94. The sensing system 92 comprises a linear sensor array 96 together with electronics used for data acquisition and control (not shown). For the purposes of this discussion, it is assumed that the linear sensor array 96 is a linear CCD array, but alternate sensor systems can be used as well. Such sensing systems are well known in the art and will not be described in further detail.

The optical system 94, again of a type known in the art, establishes an optical path from the illuminated scan line 90 to the linear sensor array 96. In a typical configuration, the optical system 94 uses a focusing lens assembly 98 to focus an image of the illuminated scan line 90 on the linear sensor array 96.

A transport mechanism, again comprising a plurality of pairs of counterrotating nip rollers 102, displaces the media holder 14 through the scan carriage at a predetermined scan rate along the object focal plane 104 of the scanner. As the original 12 passes through the scan carriage, 94 and sensing system 92 provide system 94 and sensing system 92 provide digitized representations of successive scan lines 90 of the original 12.

The media holder 14 enters and exits the scan carriage 80 through an entrance and exit apertures 106 and 108, respectively. To prevent dust and stray light from entering the scan carriage 80, the entrance and exit apertures 106, 108 are provided with flaps 110 which are biased to a closed (sealed) position by spring members 112. As illustrated, the flaps 110 are designed to pivot to an open position as the media holder 14 passes through the entrance and exit apertures 106, 108.

Figure 7A:
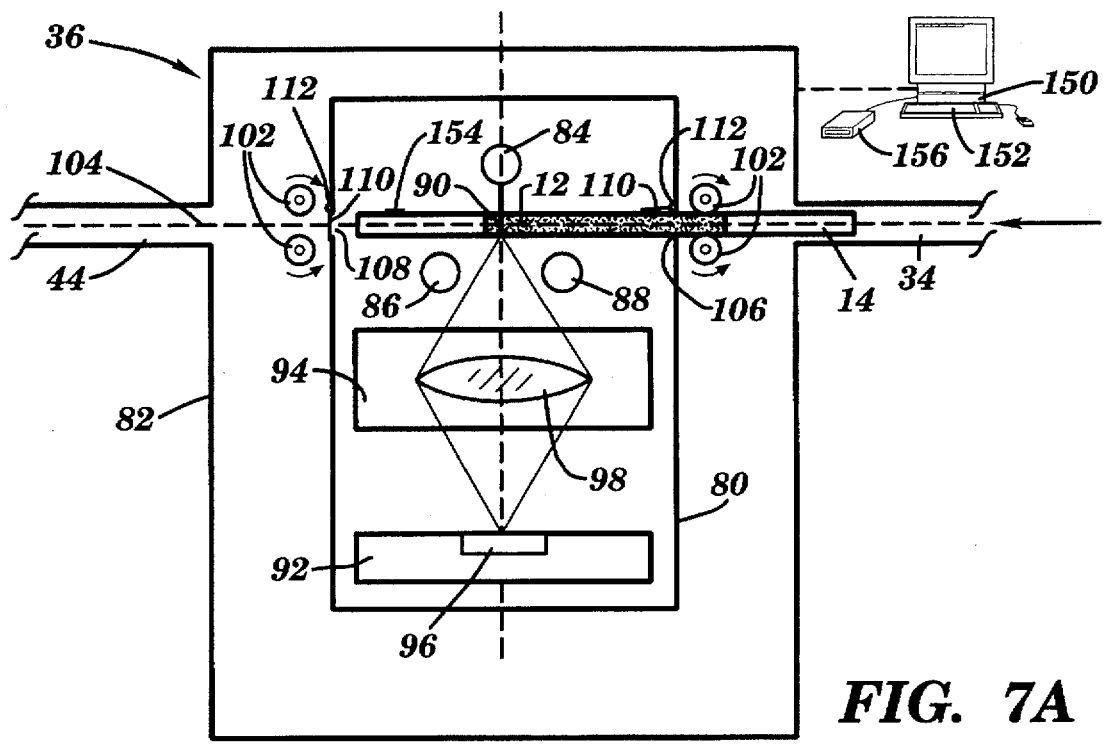
FIGS. 7A and 7B illustrate a first embodiment of a scanner for use in the scanning system of the present invention, configured for the scanning of transmissive and reflective originals, respectively.

The scanning of a transmissive original 12 is illustrated in FIG. 7A. As the media holder 14 is displaced through the scan carriage 80 by the nip rollers 102, lamp 84 illuminates the transmissive original from above, thereby providing a succession of illuminated scan lines 90. Each illuminated scan line 90 is focused on the linear sensor array 96 of the sensor system 92 by the optic system 94. The digitized representations of the scan lines 90 provided by the sensor system 92, when combined, provide a digitized representation of the transmissive original. During the scanning of a transmissive original, lamps 86 and 88 remain in an off state.

Figure 7B:
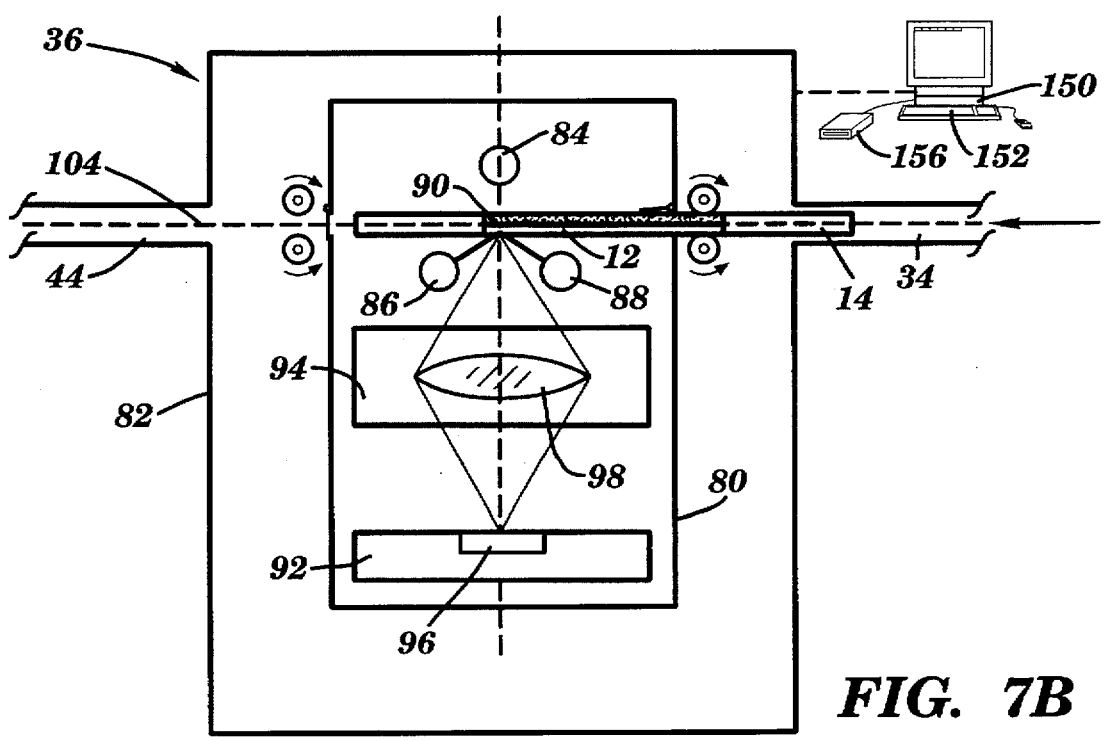

FIG. 7B illustrates the scanning of a reflective original 12. During scanning, lamps 86 and 88 illuminate the reflective original 12 from below, with lamp 84 remaining in an off state. As in the transmissive case, each successive scan line 90 is focused on the linear sensor array 96 by the optic system 94 as the media holder 14 is displaced through the scan carriage 80 along the object focal plane 104.

A second embodiment of a scanner 36', generally similar to the scanner 36 illustrated in FIGS. 7 (A–B), is shown in FIGS. 8 (A–B). In this embodiment, a first linear drive system 120, of a type known in the art, is used to displace the scan carriage 80 vertically within the outer housing 82 to selectively position an illumination module 122 on either side of the object focal plane 104, depending on the type of original 12 to be scanned. Further, a second linear drive system 124, again of a type known in the art, is used to displace the illumination module 122 horizontally within the scan carriage 80 to selectively position specific lamps within the module 122 for scanning, again depending on the type of original to be scanned.

Various configurations of the illumination module 122 are disclosed in detail in copending patent application Ser. No. 08/496,311, filed Jun. 29, 1995 by Cresens et al., and entitled ILLUMINATION SYSTEM FOR A FLAT-BED SCANNING SYSTEM, incorporated herein by reference. Generally, the illumination module includes at least one lamp 126 for illuminating a scan line 90 on a transmissive original, and at least one lamp 128 for illuminating a scan line 90 on a reflective original.

Figure 8A:
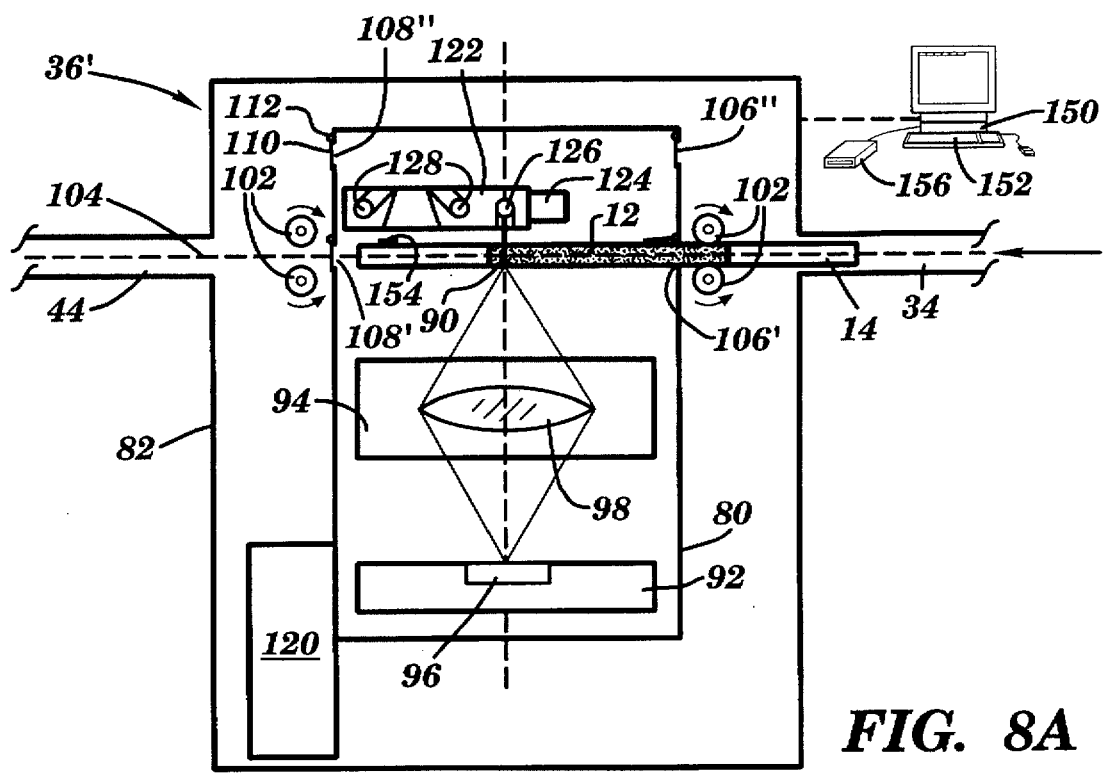
FIGS. 8A and 8B illustrate a second embodiment of a scanner for use in the scanning system of the present invention, configured for the scanning of transmissive and reflective originals, respectively.

The scanning of a transmissive original 12 is illustrated in FIG. 8A. As in the previous embodiment, the media holder 14 enters and exits the scan carriage through entrance and exit apertures 106' and 108', respectively. Again, an arrangement of nip rollers 102 is used to displace the original 12 at a predetermined scan rate along the object focal plane 104 of the scanner 36'. As the media holder 14 passes through the scan carriage 80, lamp 126 illuminates the transmissive original from above, providing a series of illuminated scan lines 90 which are sequentially focused on the linear sensor array 96 by the optic system 94. The lamp 126 is suitably positioned relative to the sensor and optic systems 92, 94 by the second linear drive system 124.

Figure 8B:
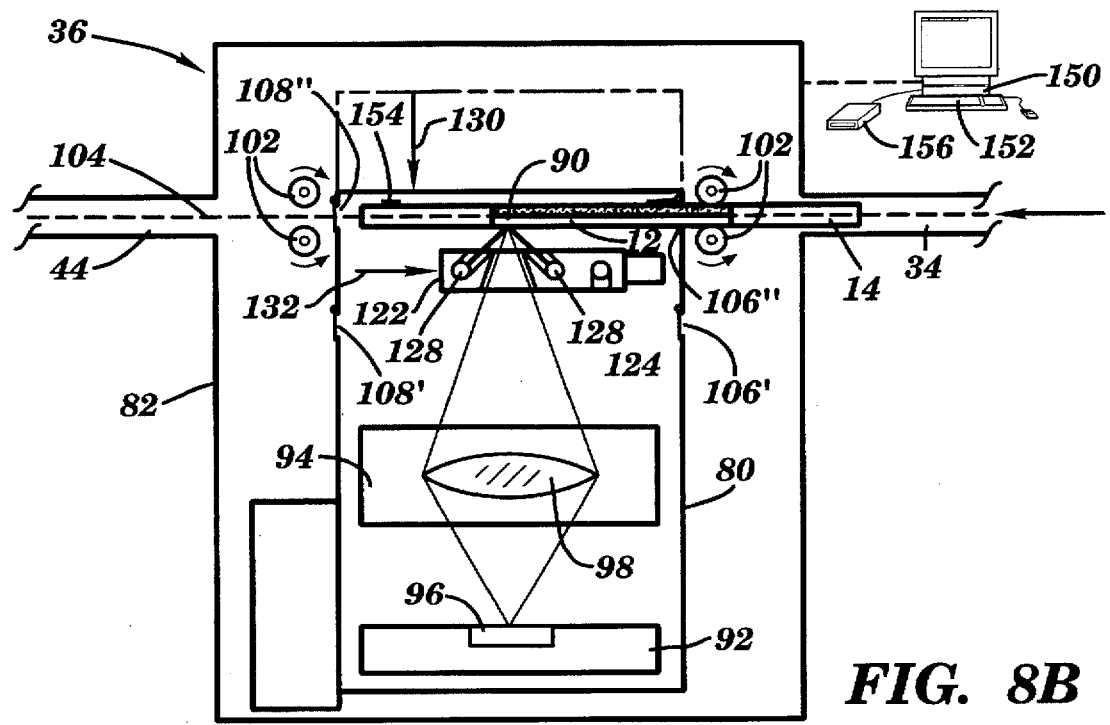

To scan a reflective original 12, the scan carriage 80 is displaced vertically (directional arrow 130) relative to the object focal plane 104 by the first linear drive system 120. Correspondingly, the illumination module 122 is displaced horizontally (directional arrow 132) within the scan carriage by the second linear drive system 124. As shown in FIG. 8B, the displacements of the scan carriage 80 and illumination module 122 are necessary to position lamps 128 for reflective scanning. Of course the vertical and horizontal displacements of the scan carriage 80 and the illumination module 122 are reversed to reposition lamp 126 for transmissive scanning.

After the scan carriage 80 and illumination module 122 have been correctly positioned for reflective scanning, the media holder 14 is displaced at a predetermined scan rate through the scan carriage 80 by nip rollers 102. For reflective scanning, as shown in FIG. 8B, the media holder 14 enters and exits the scan carriage 80 through a second set of entrance and exit apertures 106" and 108", respectively. Lamps 84, 86, 88 (FIGS. 7 (A–B)) and lamps 126, 128 (FIGS. 8 (A–B)) are selectively illuminated by a lamp controller 150. The lamp controller 150 provides control signals for illuminating specific ones of the lamps as disclosed above based on the type of original (transmissive/reflective) to be scanned. Information corresponding to the type of original to be scanned may be provided to the lamp controller 150 manually via a control panel/keyboard 152. Alternately, the information can be provided automatically by decoding identifying indicia on the media holder as the holder passes through chute 34 or before the media holder is inserted into the scanning system (e.g., by decoding a barcode 154 using a barcode reader 156).

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as deemed by the accompanying claims.

We claim:

1. A scanning system for providing a digitized representation of an original, comprising:
   a displaceable scan carriage including an illumination module for illuminating a scan line on said original, a sensor system for obtaining a digitized representation of said illuminated scan line, and an optic system for focusing said illuminated scan line on said sensor system;
   means for displacing said original through said scan carriage along an object focal plane to obtain digitized representations of successive ones of said illuminated scan lines, said digitized representations of successive ones of said scan lines together comprising said digital representation of said original;
   means for determining whether said original is a transmissive original or a reflective original; and
   means, responsive to said determining means, for displacing said scan carriage to position said illumination module on a first side of said object focal plane when scanning a transmissive original, and to position said illumination module on a second side of said object focal plane when scanning a reflective original.

2. The scanning system according to claim 1, wherein said scan carriage displacing means displaces said scan carriage along a direction substantially perpendicular to said object focal plane.

3. The scanning system according to claim 1, wherein said illumination module further includes:
   at least one transmissive illumination source for illuminating a scan line on a transmissive original; and
   at least one reflective illumination source for illuminating a scan line on a reflective original.

4. The scanning system according to claim 3, further including:
   means for displacing said illumination module so that said at least one transmissive illumination source illuminates a scan line on said original if said determining means determines that said original is a transmissive original, and for displacing said illumination module so that said at least one reflective illumination source illuminates a scan line on said original if said determining means determines that said original is a reflective original.

5. The scanning system according to claim 4, wherein said illumination module displacing means displaces said illumination module along a direction substantially parallel to said object focal plane.

6. The scanning system according to claim 1, wherein said original is mounted in a media holder, and wherein said original displacing means displaces said media holder through said scan carriage along said object focal plane.

7. A scanning system for providing a digitized representation of an original, comprising:
   a vertically displaceable scan carriage including an illumination module for illuminating a scan line on said original, a sensor system for obtaining a digitized representation of said illuminated scan line, and an optic system for focusing said illuminated scan line on said sensor system;
   means for displacing said original horizontally through said scan carriage along an object focal plane to obtain digitized representations of successive ones of said illuminated scan lines, said digitized representations of successive ones of said scan lines together comprising said digital representation of said original;
   means for determining whether said original is a transmissive original or a reflective original; and
   means, responsive to said determining means, for vertically displacing said scan carriage in a direction substantially perpendicular to said object focal plane to position said illumination module on a first side of said object focal plane when scanning a transmissive original, and to position said illumination module on a second side of said object focal plane when scanning a reflective original.

8. The scanning system according to claim 7, wherein said illumination module includes at least one transmissive illumination source for illuminating a scan line on a transmissive original and at least one reflective illumination source for illuminating a scan line on a reflective original, said scanning system further including:
   means for displacing said illumination module in a direction substantially parallel to said object focal plane so that said at least one transmissive illumination source illuminates a scan line on said original if said determining means determines that said original is a transmissive original, and said at least one reflective illumination source illuminates a scan line on said original if said determining means determines that said original is a reflective original.

9. A scanning system for providing a digitized representation of an original, comprising:
   a displaceable scan carriage including an illumination module for illuminating a scan line on said original, a sensor system for obtaining a digitized representation of said illuminated scan line, and an optic system for focusing said illuminated scan line on said sensor system;
   means for displacing said original through said scan carriage along an object focal plane to obtain digitized representations of successive ones of said illuminated scan lines, said digitized representations of successive ones of said scan lines together comprising said digital representation of said original;
   means for determining whether said original is a transmissive original or a reflective original; and
   means, responsive to said determining means, for displacing said scan carriage to position said illumination module on a first side of said object focal plane when scanning a transmissive original, and to position said illumination module on a second side of said object focal plane when scanning a reflective original;
   wherein said original enters said scan carriage through a first entrance aperture and exits said scan carriage through a first exit aperture if said original is a transmissive original, and wherein said original enters said scan carriage through a second entrance aperture and exits said scan carriage through a second exit aperture if said original is a reflective original.

10. The scanning system according to claim 9, wherein said scan carriage displacing means displaces said scan carriage along a direction substantially perpendicular to said object focal plane.

11. The scanning system according to claim 9, wherein said illumination module further includes:
    at least one transmissive illumination source for illuminating a scan line on a transmissive original; and
    at least one reflective illumination source for illuminating a scan line on a reflective original.

12. The scanning system according to claim 11, further including:

means for displacing said illumination module such that said at least one transmissive illumination source illuminates a scan line on said original if said determining means determines that said original is a transmissive original, and for displacing said illumination module such that said at least one reflective illumination source illuminates a scan line on said original if said determining means determines that said original is a reflective original.

13. The scanning system according to claim 12, wherein said illumination module displacing means displaces said illumination module along a direction substantially parallel to said object focal plane.

* * * * *